UNITED STATES PATENT OFFICE.

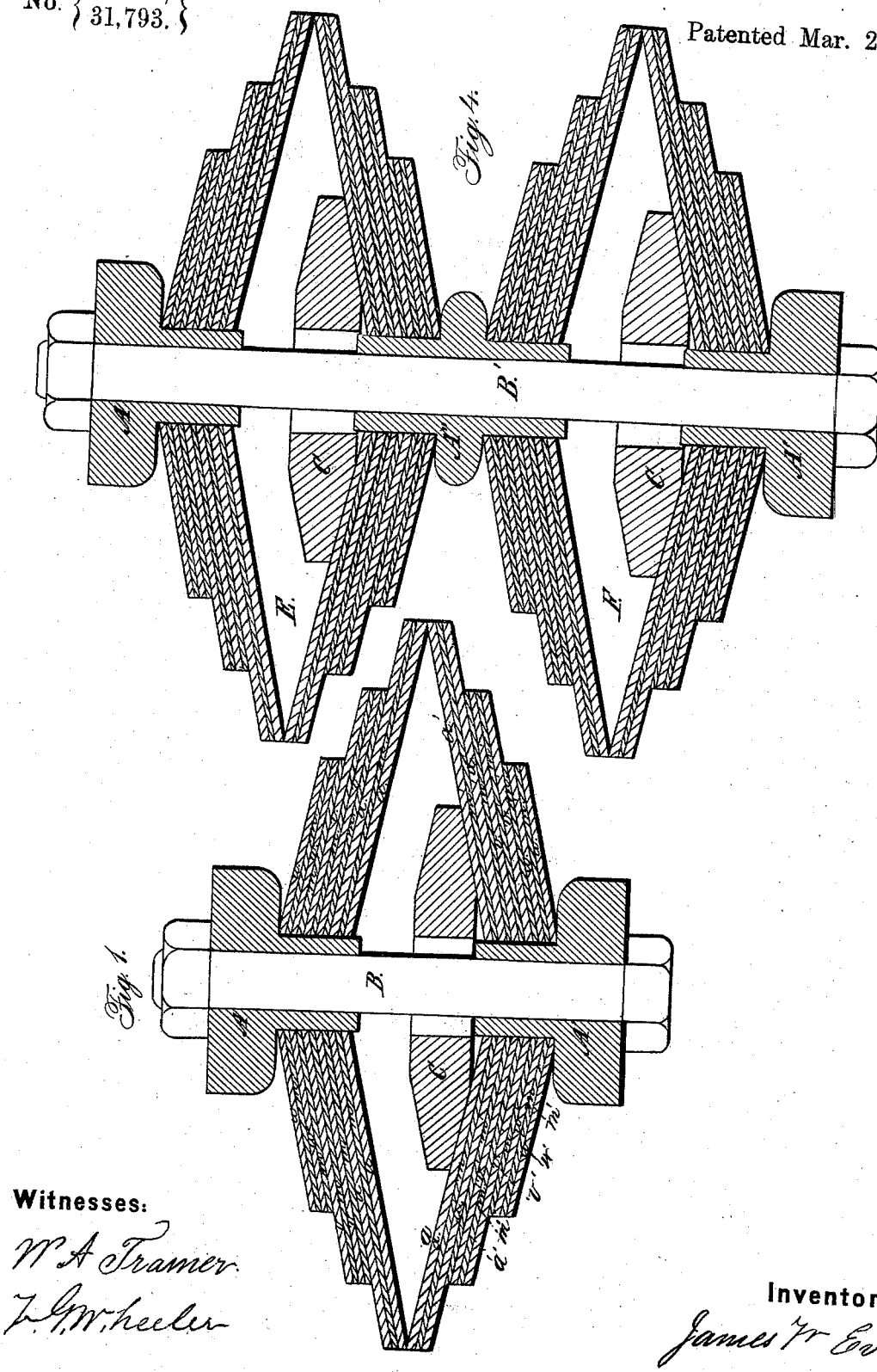

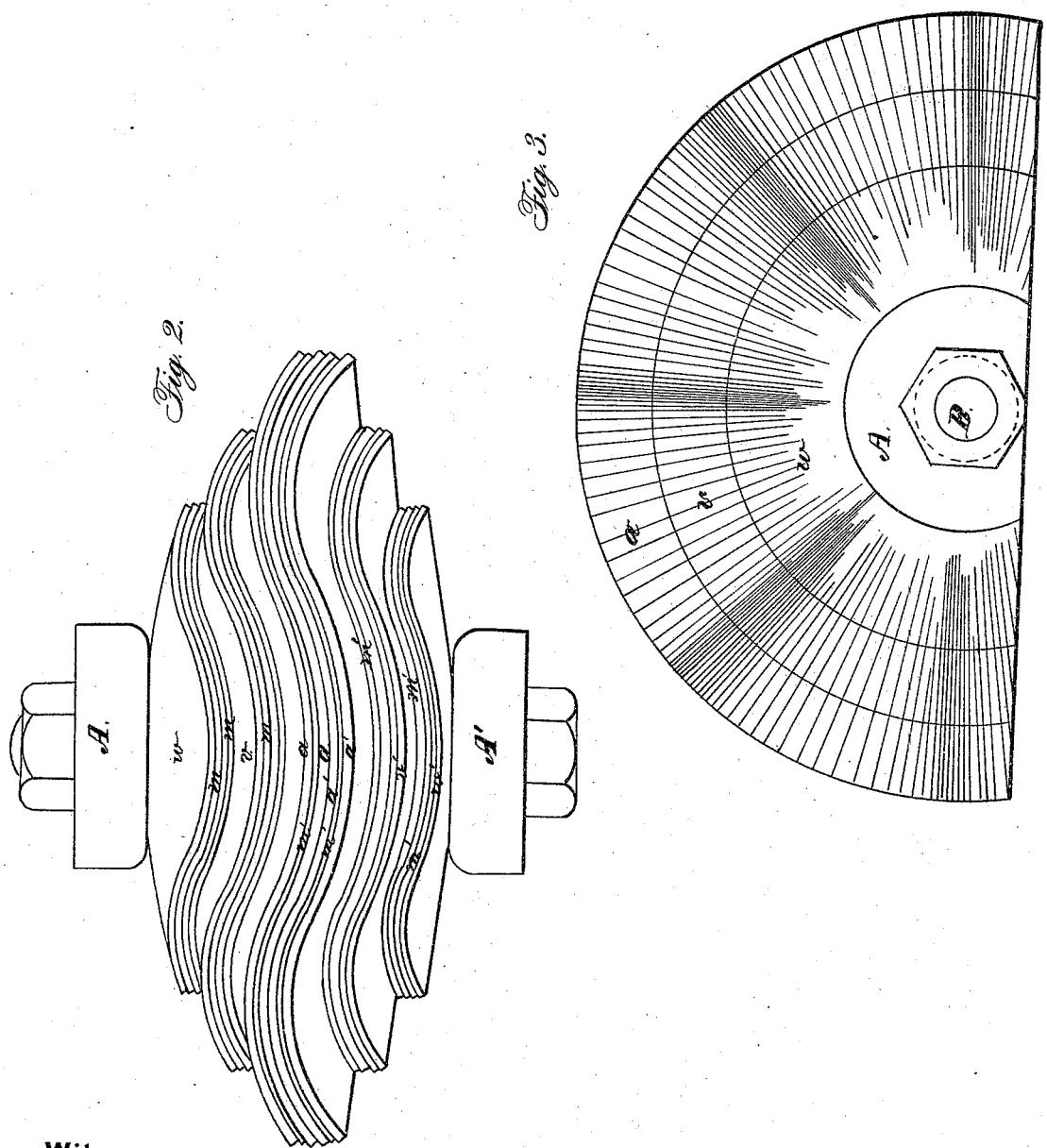

JAMES W. EVANS, OF NEW YORK, N. Y.

CUSHION-SPRING.

Specification of Letters Patent No. 31,793, dated March 26, 1861.

*To all whom it may concern:*

Be it known that I, JAMES W. EVANS, of New York, in the county and State of New York, have invented a new and Improved Cushion-Spring; and I do hereby declare that the following is a full and exact description of the same, reference being had to the accompanying drawings and to the letters of reference marked thereon.

Figure I shows a longitudinal section. Fig. II is an outside side view; Fig. III a half plan of my cushion spring, and Fig. IV represents two springs joined together in section.

The nature of my invention consists in forming springs of corrugated and conical or dish shaped plates, said corrugations being either radial or originating at or near the center of the plate and proceeding to the periphery in a voluted curve, each single plate being not more than $\frac{3}{16}$ of an inch in thickness, and duplicating the same until the desired strength is attained, as well as grading the diameter in combination with the thickness, whereby I obtain by the least weight of metal, the greatest amount of strength and an equality of elasticity.

The object and advantage of making the spring of very thin plates of metal is to obtain thereby a more equal and perfect quality of steel, as thin plates are more equally and thoroughly impregnated and at the same time insure a more perfect temper to the steel plates, in consequence of which a more perfect elasticity can be, and is obtained, by a less weight of material in proportion to thicker and heavier plates.

According to the use to which the spring is to be employed, it is necessary to determine first the number of corrugations which it will be most advisable to employ, but for general purposes I use only four or six. I next determine the amount of corrugation necessary at each distance from the center of the plate, selecting generally that amount which would under adequate pressure allow of all the plates becoming flattened into a disk, without crushing the material of the plate at any point, but simply overcoming its elasticity. The size and number of corrugations being determined I then forge, temper, and finish my spring plates in the usual way, recommending never to use plates thicker than $\frac{3}{16}$ of an inch, and that thickness only when the spring is from 10 to 12 inches or more in diameter, and decreasing in some cases in thickness as the diameter diminishes, obtaining the required stiffness and strength by using two or more thicknesses placed one upon the other.

To construct my cushion spring I put two or more plates, *a, a,* corrugated in the manner above described and of the required diameter and thickness, upon each other, above these I place two, three or more plates, *v, v,* of a smaller diameter and of less thickness, and a third set of plates, W, W, upon those again of smaller diameter and less thickness than the preceding plates, and continue in this manner, until the required strength is obtained.

Instead of diminishing the thickness of the plates, as the diameter of the different layers diminishes, the plates may in some cases be made all of the same thickness, but in no case I should advise to use plates thicker than $\frac{3}{16}$ of an inch, preferring always a greater number of plates as well as different layers. Between each of these plates I place a soft, elastic, or malleable substance, *m,* such as felt, cloth, lead, india rubber, gutta-percha, copper, or their equivalent. I then place these plates and their elastic or soft substances upon a sleeve A, the whole forming, when together, a corrugated cup or shell, and one half of my cushion spring. I then construct a similar cup of the plates *a′, v′, w′,* with their corresponding intermediate soft substances, *m′,* which are placed upon a sleeve A′, and form the other half or lower corrugated cup of my spring. These two corrugated cups or shells are then combined and fastened together by a spindle or bolt, B, in such a manner, that the crest of each corrugation of the lower cup fits into the trough of the corresponding corrugation of the upper cup and vice versa, whereby a bearing all around the periphery of the central plates is obtained as represented in Figs. I, II and IV.

In cases where a great amount of motion is required two or more cushion springs or complete cups E, F, Fig. IV, constructed as above described, may be placed above each other, the whole being connected together, and working on one spindle or bolt, B′, the connecting sleeve A″ being in that case made in such a manner as to receive the plates of the lower cup of the upper spring E as well as the plates of the upper cup of the lower spring F. By increasing in that manner the number of cups or springs, the amount of motion will likewise be multiplied. In the arrangement of two or more cups one above the other I advise the steel plates of the upper cup to be made a little lighter than the plates forming the lower cup, so that said upper spring shall be first acted upon and compressed before the weight acts on the lower cup, by which an easy motion is obtained. Into the inside of these cups or shells I place an india rubber ring or disk or its equivalent, C, tapering toward its periphery, by which the strength of the spring is considerably increased and the plates find a bottom, near the latter part of the motion of the plates and when under a very heavy load, preventing thereby the breaking or fracturing of the plates, as well as the turning outward of the same.

The sleeves A, A' or A'' not only bind and attach together the several plates which form one cup or shell, but act at the same time as guides for the bolt or spindle B or B' and prevent the continued action of these plates from cutting said bolt or spindle through, as would be the case without such a long bearing surface.

The operation of my cushion spring is as follows: When a force is applied to press the cups together the centers of the upper plates are forced downward, and of the lower plates upward, but as these plates are cupped or arched the centers cannot approach, without pressing the peripheries of the plates outward. This is possible in consequence of the plates being corrugated and consequently elastic in the line of their periphery and on account of their being cupped or dished, the same are likewise elastic in their radial direction, thereby giving perfect equality for the expansion of the whole disk, a feature of paramount importance, as by this means the weight of metal constituting such a constructed spring is reduced to the least amount, and a spring as here represented in Fig. II, six inches in diameter, weighing complete six pounds and containing four pounds of metal steel plates will bear a weight of 8,000 pounds, and giving with this weight a free and easy action or motion.

In consequence of the positive certainty of good and even tempering of very thin metallic plates, of which I construct my cushion spring, and in consequence of the herein described plan and arrangement of forming and strengthening the same, I am able, at a very trifling expense, on account of the small quantity of material used, to produce a spring to bear almost any amount without the least fear of breaking the same, or even splitting on their edges, while the introduction of the india rubber ring in the center of each cup will prevent any straining or reversion of the plates, and allow the same to find a bottom, if a weight greater than that intended should be brought to bear on the same.

The use of the elasticity and expansion resulting from corrugated and cupped metal plates has before this been used and employed for different purposes as in the case of P. G. Gardiner's car wheel patented May 1st, 1847, and I do therefore not claim broadly the use of such plates for the formation of springs, but

What I claim as my invention and desire to secure by Letters Patent is—

1. Grading the diameters of circular corrugated disk plates in combination with the grading of the thicknesses of the plates in the manner as described and for the purpose of obtaining the necessary strength and stiffness.

2. The arrangement and combination of all the parts as herein described in the manner and for the purpose substantially as set forth.

JAMES W. EVANS.

Witnesses:
W. A. TRAINER,
T. G. WHEELER,
H. C. BANKS.